United States Patent [19]

Kendall et al.

[11] 3,976,287
[45] Aug. 24, 1976

[54] SHOCK ISOLATOR CONSTRUCTION
[75] Inventors: Giles A. Kendall, Burbank; James E. Robertson, Woodland Hills, both of Calif.
[73] Assignee: Menasco Manufacturing Company, Burbank, Calif.
[22] Filed: Aug. 5, 1974
[21] Appl. No.: 494,563

Related U.S. Application Data
[63] Continuation of Ser. No. 297,757, Oct. 16, 1972, abandoned.

[52] U.S. Cl. .............................. 267/139; 188/268; 188/322; 213/43; 293/85; 293/89
[51] Int. Cl.² ............................................. F16F 9/30
[58] Field of Search ........... 188/268, 280, 282, 317, 188/322; 16/51, 52; 213/43; 267/113, 139; 92/85; 293/85, 88, 89

[56] References Cited
UNITED STATES PATENTS
2,953,810   9/1960   Hall ......................................... 16/52
3,715,139   2/1973   Tuggle ................................. 188/268

FOREIGN PATENTS OR APPLICATIONS
931,911   11/1947   France ................................ 188/317

OTHER PUBLICATIONS
Kendall, Giles A., The Menasco Energy Absorbing Unit and Its Application To Bumper systems, report No. 710536 given to the Society of Automotive Engineers, June 7–11, 1971.

*Primary Examiner*—George E. A. Halvosa
*Attorney, Agent, or Firm*—Robert E. Geauque

[57] ABSTRACT

A shock isolator wherein a piston is movably mounted within a compressible solid chamber formed within a housing, the piston including first passages and second passages, the compressible solid material to be extracted through said first passages during an extension of the piston, the compressible solid material to be extracted also through the second passages during retraction of the piston, a ring surrounding the piston, the ring to close off the second passages during extension of the piston, during retraction of the piston the ring to move to permit the compressible solid material to flow therethrough.

9 Claims, 7 Drawing Figures

SHOCK ISOLATOR CONSTRUCTION

This is a continuation, of application Ser. No. 297,757 filed Oct. 16, 1972, and now abandoned.

BACKGROUND OF THE INVENTION

The field of this invention relates to shock isolators and more particularly to a spring damper which employs the use of a compressible solid material, such devices to have different damping rates depending upon the direction of stroke.

The shock isolator of this invention has been found to be especially useful in automobiles to be located between the body of the vehicle and the bumper. However, it is considered to be within the scope of this invention to employ the apparatus of this invention in any other environment as it is well known that spring damping apparatuses are used in numerous fields.

Automobiles have always employed some means to protect the body of the vehicle from slight bumps. Such means have normally been bumpers which are located in the front and rear portions of the vehicle. The bumpers are normally formed of a rigid piece of material, such as steel, which is rigidly secured to the vehicle. Upon the vehicle being struck by another vehicle, or the vehicle striking a fixed object, the material of construction of the bumper normally fails upon incurring even a quite small impact force. Additionally, such bumpers normally directly transmit the force into the vehicle itself. Such transmission of force is undesirable since it causes further damage to the vehicle.

Other bumpers have been developed for vehicles which absorb impact forces and do not normally transmit any significant amount of force to the vehicle structure itself as a result of normal impact forces.

In some cases, these bumpers incorporate energy absorbing units which make use of compressible solid material as the working medium. The compressible solid material has the capability of absorbing the impact load during extension of the piston into the material, and after extension thereof automatically causes the piston to be retracted back to its initial position. These devices using compressible solids have usually employed a fixed orifice area on the piston head which was primarily designed for the absorbing of the energy during the extension movement with little consideration being given to the retraction movement. Therefore, the retraction would be accomplished in an extremely low rate because the orifice area is required to be quite small for energy absorption. Further, in low temperature applications, the compressible solid material tends to increase in shear strength which may prevent prompt retraction of the piston.

SUMMARY OF THE INVENTION

The spring damping apparatus of this invention produces two different damping rates in that it produces a high damping force during compression of the compressible solid material upon extension of the piston and a relatively low damping force upon expansion of the compressible solid material during return of the piston. Thus, the retraction of the piston by the compressible solid material is accomplished at a faster rate. The apparatus employs a cylinder which is closed at one end and has an opening for the piston rod at the other end. The piston and compressible solid material is located within the chamber within the cylinder. The piston is movable within the chamber and includes orifice means to permit movement of the compressible solid material from one side of the piston to the other. A plastic type of seal surrounds the piston rod and is in contact with the cylinder adjacent the other end. The orifice means within the piston includes a first passage means and a second passage means. The first passage means provides for a significantly smaller area than the second passage means. The first passage means is to be employed during extension of the piston with the first and second passage means being employed during retraction of the piston. A ring is located about the piston and is in continuous contact with the wall of the chamber. The ring during extension of the piston rod is moved to a position to close the second passage means and prevent movement of the compressible solid material therethrough. During the retraction movement of the piston, the ring is caused to move to a position to open the second passage means. The ring may be floatingly mounted about the piston or it may be in sliding contact with the piston.

DETAILED DESCRIPTION OF THE SHOWN EMBODIMENT

Figure 1:
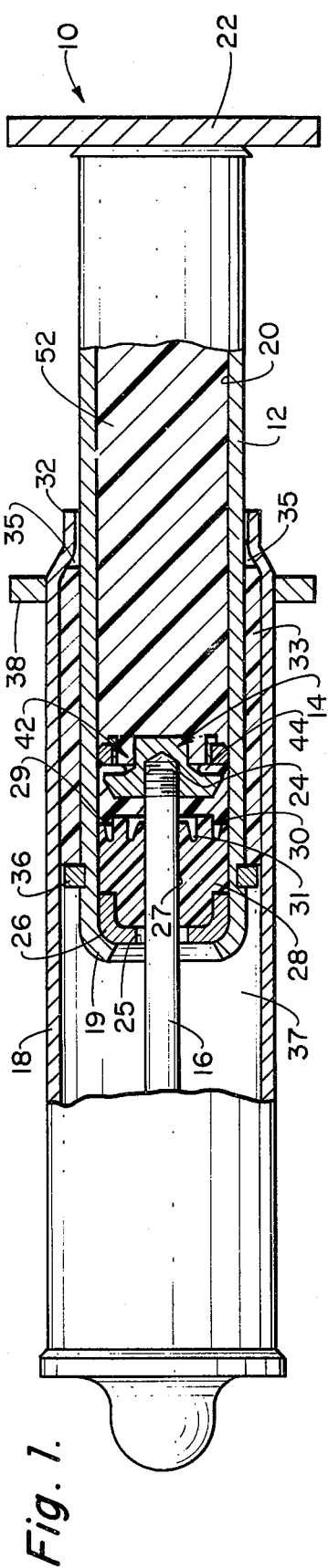
FIG. 1 is a longitudinal cross-sectional view of the damping apparatus of this invention as it would be employed in a typical overall damping unit.
Figure 4:
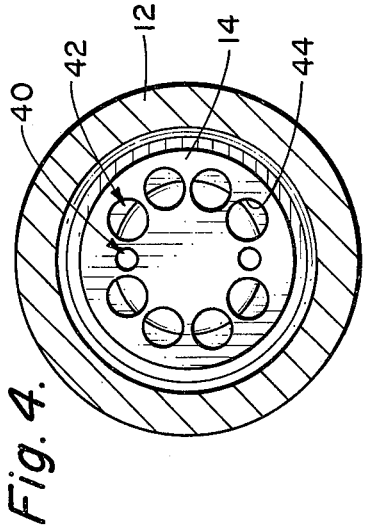
FIG. 4 is a cross-sectional side view of the piston head within the damping apparatus of this invention taken along the line 4—4 of FIG. 3.

Referring particularly to the drawing, there is shown in FIG. 1 the spring damper 10 of this invention being basically composed of a cylinder 12, a piston head 14, a piston rod 16 and an outer sleeve 18. The cylinder 12 is substantially cylindrical and defines an interior chamber 20. The chamber 20 is closed by attachment of an end plate 22 at one end of the cylinder 12. The end plate 22 can be a portion of the automotive bumper which is located outwardly from the main body of the vehicle.

The piston head 14 located within chamber 20 includes a threaded aperture 24 therein within which the piston rod 16 is threadably secured.

The open end 19 of the cylinder 12 is shown to be crimped inwardly with a seal retainer 26 located interiorly thereof. The seal retainer 26 is basically annular in configuration and forms an aft supporting structure for the seal 28. The seal 28 is forced against the retainer 26 and the piston rod 16 moves through openings 25 and 27 in the retainer 26 and seal 28 respectively.

It is to be noted that the forward surface 30 of the seal 28 includes a plurality of spaced apart annular depressions 29 and 31. It is the function of depression 29, as the force increases within the chamber 20, to inherently produce a tighter sealing arrangement between the seal and the interior surface of the cylinder 12. It is the function of the depression 31 to produce an anti-extrusion fit between piston rod 16 and opening 27 in the seal 28. A desirable form of material of construction for the seal 28 is contemplated bo be a thermoplastic polymer plastic material such as Delrin marketed by DuPont. Further, it is desired that the polymers be manufactured by thee polymerization of formaldehyde. Among the advantages which are desirable in this instance for this particular type of seal are excellent fatigue endurance, natural lubricity, and a wide useful temperature range. The useful temperature range is particularly advantageous in that it is contemplated that the damping apparatus of this invention will be used in sub-zero climates as well as in extremely hot arid climates.

The free end of the piston rod 16 bears against end 34 of the outer sleeve 18 and the open reduced end 32 of the sleeve receives the cylinder 12. An annular ring 36 is loacted within a groove in the cylinder 12. This plastic band 33 is located in the annular space 35 between the cylinder 12 and the sleeve 18 and the ends of the band normally engage the stop ring 36 and the end 32 when its reduction commences. The band 33 is fabricated of a plastic material, such as Delrin, so that it will not adhere to the surface of either sleeve 18 or cylinder 12, even though these surfaces develop rust. It is desirable that the band 33 be formed of a rigid, non-compressible material so that the rigidity of the band will stop the retraction movement of the piston. The material of Delrin is such a rigid non-compressible material. Also because the band 33 fits snugly within the space 35, it provides a guide for movement of sleeve 18 along the cylinder 12 during extension and retraction of piston 14 so that undesirable bending forces will not develope on the piston rod. The band also serves as a seal to prevent the entrance of moisture and undersirable gases into the interior space 37 of the sleeve 18 and prevents rotation which would otherwise result from the engagement of sleeve 18 with cylinder 12.

A flange 38 is fixedly mounted exteriorly about the outer sleeve 18, and serves as an attachment for mounting the spring damper 10 to the vehicle frame which is to be protected by teh bumper 22. It is understood that the mounting 38 and plate 22 could be connected to any two structures which move relative to one another.

The piston head 14 includes first passage means 40 and second passage means 42 extending therethrough. The first passage means 40 comprises two passages diametrically spaced apart about the piston head 14. The second passage means 42 comprises eight in number of passages located around the piston head 14. It is to be noted that the physical size of each of the passages within the second passage means 42 is substantially larger than the physical size of each passage within the first passage means 40.

An annular recess 44 is formed about the piston head 14 and communicates with each of the passages within the second passage means 42. Formed about the piston head 14 is a supporting area 46. A valve ring 48 is to be movably mounted upon the supporting area 46 with the outer circumference of the ring 48 being in continuous contact with the cylinder wall 12. The piston surface 50 adjacent the recess 44 is spaced from the interior surface of the cylinder 12 to frame an orifice passage 49 around the piston 14.

Figure 3:
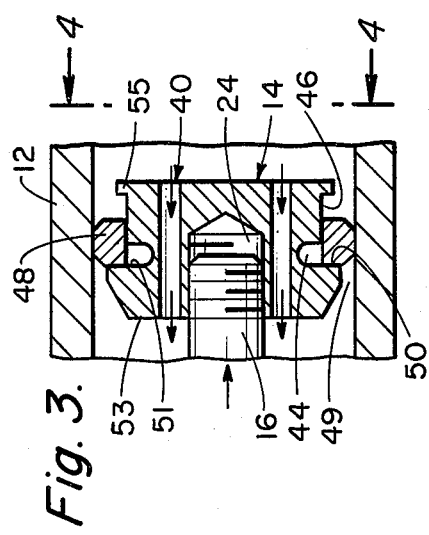
FIG. 3 is a view similar to FIG. 2 but showing the movement of the compressible solid material through the first passage means during extension of the piston head.

Referring particularly to FIG. 3, of the drawing, when the piston head 14 is extended to the right, a compression of the compressible solid material 52 located within the chamber 20 is caused because of the entrance of rod 16 into chamber 10. Also, a portion of the material is caused to be conducted through the first passage means 40 to the opposite side of the piston head 14 resulting in a damping reaction force resisting movement of the piston. The ring valve 48 moves into the compressible solid and is forced into contact with the aft side 51 of the recess 44. As a result, the space 49 between the piston and cylinder is blocked preventing movement of compressible solid material therebetween. Therefore, compressible solid material can only be conducted through the first passage means 40 and not through the second passage means 42 so that a high damping force, as well as the spring force continually opposes extension of the piston into the material 52.

Figure 2:
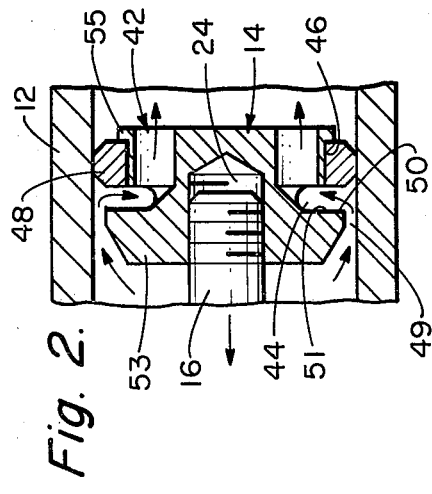
FIG. 2 is a diagrammatic view of the piston head employed within the damping apparatus of this invention showing the compressible solid material being conducted through the second passage means during retraction of the piston head.

Referring particularly to FIG. 2 of the drawing, during retraction movement of the piston head 14 to the left, the compressible solid material is permitted to be conducted from the aft side 53 of the piston head through the first passages 40 to the front side of the piston head 14. The compressible solid material is also conducted through the second passages 42 due to the material forcing the ring 48 agains the flange 55 on the piston head thereby permitting the material to be conducted through the orifice 49, the recess 44 and the second passages 42 and to the forward side of the piston head 14. During extension of the piston head the pressure of the compressible sold in the cylinder increases and upon cessation of the impact load, the pressure will act on the piston rod cross-sectional area in a direction to retract the piston and reduce the material pressure by reducing the length of piston rod within the cylinder. It is desirable that the retraction of the piston occur within a short time interval so that the spring damper is again in position to resist an impact load. The damping resistance force to retraction movement of the piston head is greatly reduced by increasing the total damping orifice area available to material flow past the piston during retraction thereof. The large orifice is partially useful to obtain fast retraction of the piston head in very cold environments where the resistance to movement of the solid material through an orifice is increased.

An advantage of the structure shown in FIGS. 1–4 is that the ring 48 is in continuous contact with the piston head 14 as well as cylinder 12. This provides lateral support for the piston head 14 preventing piston head wobble within chamber 20. Also, as the piston extends to the right upon an impact on bumper 22, the band 33 and sleeve 18 support the piston rod in alignment with the axis of cylinder 12 so that bending of the rod is prevented.

Figure 7:
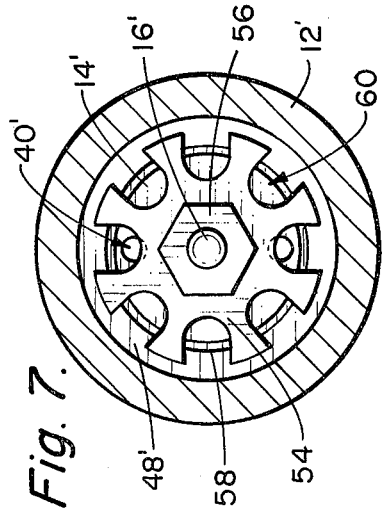
FIG. 7 is a cross-sectional view of the modified form of the piston head of this invention taken along line 7—7 of FIG. 6.
Figure 6:
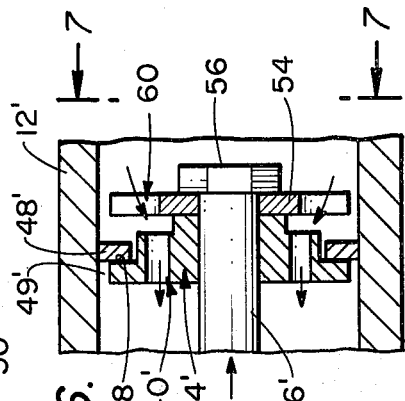
FIG. 6 is a view of the modified form of piston head of this invention depicting the compressible solid material being conducted through the first passage means which would occur during extension of the piston head.
Figure 5:
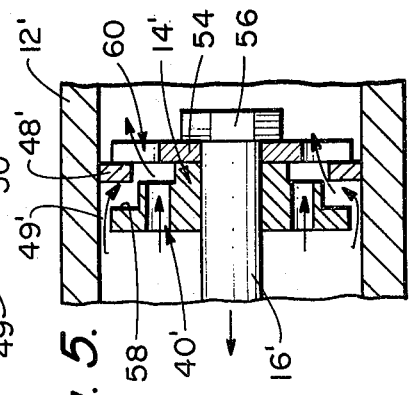
FIG. 5 is a modified form of piston head employed within this invention showing the compressible solid material being conducted through the first and second passage means.

Referring to the modified form of piston head shown in FIGS. 5 through 7 of the drawing, like numerals have been employed to refer to like parts. The piston head 14' is spaced for the interior of cylinder 12 to form an annular orifice passage 49'. A separate plate 54 is fixedly attached adjacent the piston head 14' by means of nut 56 which connects with the piston rod 16'. The plate contains a plurality of U-shaped slots 60 about its circumference which assist in the compressible solid movement.

A distinction of the invention depicted in FIGS. 5 to 7 is that while the ring 48' slidably engages the interior surface of cylinder 121, it is spaced a slight distance from the surface 46' of the piston head 14'. This spacing causes the ring 48' to "float" between the plate 54 and the shoulder 58 of the piston head 14'.

The operation of the modification shown in FIGS. 5 to 7 is basically the same as that of the first embodiment of FIGS. 1–4. During extension of the piston head 14', the compressible solid material is conducted through the slots 60 and the passages 40' to the aft side of the piston head 14. However, no compressible solid material is permitted to be conducted past the ring 48', therefore causing all of the compressible solid material to be conducted through the restrictive small area of the passages 40'.

However, during retraction of the piston head 14', the compressible solid material is not only caused to pass through the passages 40' but also through the passage 49', around the ring 48' and through the slots 60. Therefore, a significantly larger area is available to permit passage of compressible solid material from the aft end of the piston head 14' to the fore end of the piston head 14'.

In assembling the damping apparatus of this invention, it is desirable to preload the material within the chamber 20 to a pressure between six to eight hundred pounds per square inch. This is accomplished by locating the compressible solid material, the piston head 14, the seal 28, and the seal retainer 26 in the chamber 20 and then forcing the seal retainer 26, seal 28 and piston head 14 into the solid material until the desired prepressure is obtained. While maintaining this pressure, the cylinder 12 is crimped about the seal retainer 26.

Sleeve 18, band 33 and ring 36 are placed around the cylinder 12. Thereafter, a force is applied to move piston head 14 slightly away from seal 28 and then the end 32 is crimped inwardly at the forward end of band 33 so that the band holds the piston head in displaced position prior to experiencing an impact. This displacement prevents the piston from bearing against the seal in the event a tension force is applied to the piston head in a direction opposite from that of the impact force. Such a force will be transmitted from the bumper 22, through ring 36, band 33 and sleeve 18 to bracket 38. During an impact load, the sleeve 18 will move forwardly along cylinder 18 and will be guided by reduced end 32 and band 33 so that cocking of the piston rod by lateral force components will be resisted.

It is to be understood that automatically by the movement of the piston head 14 away from the seal 28 there will be a certain amount of additional preloading of the material within the chamber 20. This is caused due to the inclusion of an additional volume of the piston rod 16 within the chamber 20. It is important that the band 33 be sufficiently rigid so that with the sleeve 18 in the fully retracted position that the piston head 14 be maintained in its predetermined position which is displaced from the seal 28.

A typical compressible solid material is conventionally available from Dow Corning Corporation under the trade name of "Silastic." However, it is to be understood that the apparatus of this invention may be employed with other types of compressible solid material as well as non-compressible solid materials such as a fluid material.

What is claimed is:

1. A shock isolator apparatus comprising:
    a tubular housing having an internal chamber formed therein, said housing having a closed end and an open end;
    a compressible solid substance contained within said chamber being capable of absorbing energy;
    a piston movably supported within said chamber;
    orifice means associated with said piston for permitting said substance to move from one side of said piston to the opposite side of said piston to produce a damping resistance force on said piston head;
    a piston rod secured to said piston and extending from said housing through said open end;
    sealing means mounted within said chamber adjacent said open end of said housing, said piston rod passing through said sealing means and being movably mounted in respect thereto, said sealing means closing said open end of said chamber, said substance completely filling the portion of said chamber between said piston and said sealing means;
    said orifice means comprising first and second passage means;
    valve means movable relative to said piston head;
    said valve means being positioned by said substance during extension of said piston to close said second passage means to passage of said substance and being positioned during retraction of said piston by said substance to open said second passage means to passage of the substance, said first passage means being continually open;
    a sleeve of a larger diameter than said housing, one end of said sleeve being closed and attached to said piston rod,
    the opposite end of said sleeve being open and located around said housing intermediate the ends thereof; and
    an annular stop ring affixed to said housing at a location between said one end and said open end of said sleeve, a rigid non-compressible band located between said stop ring and said open end having a thickness corresponding to the difference in diameter between said sleeve and said housing to thereby be snugly retained therebetween, the open end of said sleeve being crimped over the adjacent end of said band to establish the fully retracted position of said piston, said fully retracted position results in said piston being displaced from said sealing means, said substance being under substantial compression when said piston is in said fully retracted position, whereby said compression is sufficient to automatically return said piston from said extended position to said retracted position.

2. A shock isolator apparatus comprising:
    a tubular housing having an internal chamber formed therein;
    a compressible solid substance contained within said chamber capable of absorbing impact energy;
    a piston movably supported in said chamber within said housing;
    a piston rod having one end connected to said piston; one end of said housing being closed and the other end of said housing being open to permit passage of said piston rod therethrough;

sealing means connected to said housing to seal said open end of said housing around said piston rod, said sealing means closing said open end of said chamber, said substance completely filling the portion of said chamber between said piston and said sealing means;

a cylindrical sleeve of greater diameter than said housing;

one end of said sleeve being closed and connected to the other end of said piston rod, the opposite end of said sleeve being open and located around the said housing intermediate the ends of said housing;

an annular stop ring affixed to said housing at a location between said one end and said open end of said sleeve;

a rigid non-compressible band located between said stop ring and said open end of said sleeve and having a thickness corresponding to the difference in diameter between said sleeve and said housing to thereby be snugly retained therebetween, the open end of said sleeve being crimped over the adjacent end of said band to establish the fully retracted position of said piston, said fully retracted postion results in said piston being displaced from said sealing means, said substance being under substantial compression when said piston is in said fully retracted position, whereby said compression is sufficient to automatically return said piston from said extended position to said retracted position.

3. A shock isolator as defined in claim 2 wherein said sealing means comprises a solid plastic body having a center opening for slidably receiving said piston rod and an exterior cylindrical surface engaging the interior surface of said housing;

a first annular recess in the forward surface of said sealing means located adjacent the interior surface of said chamber and by said substance force said sealing means against said housing surface, and a second annular recess in the forward surface of said sealing means adjacent said opening for said piston rod pressurized by said substance to force said sealing means against said piston rod and prevent extrusion of said substance out of said housing.

4. In a shock isolator;

a piston movable in an open ended chamber containing a compressible solid energy absorbing medium, the volume of said medium completely filling the volume of said chamber;

a piston rod connected at one end to said piston and extending posteriorly of said medium;

sealing means located at the position said rod extends out of said medium, said sealing means closing said open end of said chamber, said substance completely filling the portion of said chamber between said piston and said sealing means;

annular means forming said chamber and fixed in respect to said confined medium and extending coaxially of said piston rod;

a sleeve of greater diameter than said annular means, one end of said sleeve engaging the other end of said piston rod and the opposite end of said sleeve being open and located around a portion of said annular means;

stop means affixed to said annular means at a location between said one end and said open end of said sleeve;

rigid non-compressible band means located between said annular means and said sleeve; and confining means on said sleeve for retaining said band means between said stop means and the open end of said sleeve, upon said band means being in contact with said stop means and said confining means further retractive movement of said piston rod in said energy absorbing medium towards said sealing means is prevented and said piston is displaced from said sealing means and said medium is under substantial compression, whereby said compression is sufficient to automatically return said piston from said extended position to said retracted position.

5. A shock isolator as defined in claim 4 wherein: said stop means comprises an annular stop ring affixed to the exterior surface of said annular means.

6. A shock isolator as defined in claim 4 wherein: said band means having a thickness substantially corresponding to the difference in diameter between said sleeve and said annular means.

7. A shock isolator as defined in claim 1 wherein: said confining means comprises a crimped end of said sleeve commencing at a location along said open end which determines the desired position of the piston at the maximum extended position.

8. A shock isolator as defined in claim 7 wherein: said band means comprises a plastic material separating the interior of said sleeve from the exterior of said annular means thereby preventing direct interaction between said sleeve and said annular means and sealing the space in between said sleeve and said annular means.

9. A shock isolator as defined in claim 4 wherein: said sealing means comprises a solid plastic body having a center opening for slidably receiving said piston rod and an exterior cylindrical surface engaging the interior surface of said annular means;

a first annular recess in the forward surface of said solid plastic body located adjacent said confined medium, a second annular recess in said forward surface of said solid plastic body, said first annular recess located adjacent the periphery of said solid plastic body with said second annular recess located adjacent said opening for said piston rod, the external force created within said confined medium is applied to both said first and second annular recesses and causes respectively said plastic body to be forced against said annular means and said piston rod and as the pressure increases so does the forcing of said body into contact with said annular means and said piston rod.

* * * * *